United States Patent
Baltaxe et al.

(10) Patent No.: US 11,420,579 B2
(45) Date of Patent: Aug. 23, 2022

(54) SYSTEM AND METHOD TO AUTOMATICALLY SET THE HEIGHT OF THE TORSO SECTION OF A SEAT BELT

(71) Applicant: GM GLOBAL TECHNOLOGY OPERATIONS LLC, Detroit, MI (US)

(72) Inventors: Michael Baltaxe, Ra'anana (IL); Ruben Mergui, Ramat Gan (IL); Gila Kamhi, Zichron Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 16/448,932

(22) Filed: Jun. 21, 2019

(65) Prior Publication Data

US 2020/0398778 A1    Dec. 24, 2020

(51) Int. Cl.
*B60R 22/20* (2006.01)
*B60R 21/015* (2006.01)
*B60R 21/01* (2006.01)

(52) U.S. Cl.
CPC ........ *B60R 21/01552* (2014.10); *B60R 22/20* (2013.01); *B60R 2021/01265* (2013.01); *B60R 2022/208* (2013.01)

(58) Field of Classification Search
CPC .............. B60R 22/20; B60R 2022/208; B60R 2022/485; B60R 21/01544; B60R 21/01552; B60R 2021/01265
See application file for complete search history.

(56) References Cited

U.S. PATENT DOCUMENTS

| | | | |
|---|---|---|---|
| 3,572,833 A | 3/1971 | Pavliscak | |
| 9,434,349 B1 * | 9/2016 | Perkins | B60R 22/48 |
| 10,953,850 B1 * | 3/2021 | Pertsel | G06N 20/00 |
| 2001/0003168 A1 | 6/2001 | Breed et al. | |
| 2002/0116106 A1 * | 8/2002 | Breed | B60Q 1/143 |
| | | | 701/45 |
| 2007/0176408 A1 | 8/2007 | Clute | |
| 2008/0036580 A1 * | 2/2008 | Breed | G01S 15/04 |
| | | | 340/438 |
| 2008/0189053 A1 * | 8/2008 | Breed | B60N 2/0276 |
| | | | 702/41 |
| 2009/0066065 A1 * | 3/2009 | Breed | B60R 25/257 |
| | | | 280/735 |

(Continued)

FOREIGN PATENT DOCUMENTS

CN    201062034 Y    5/2008
CN    104842927 A    8/2015
(Continued)

OTHER PUBLICATIONS

Chinese Office Action Issued in CN Application No. 202010542678.8, dated Apr. 19, 2022, 17 Pages.

*Primary Examiner* — Barry Gooden, Jr.
(74) *Attorney, Agent, or Firm* — Cantor Colburn LLP

(57) ABSTRACT

A vehicle, system and a computer-implemented method for setting a height of a seat belt in a vehicle. The system includes a computer vision module, a motor and a controller. The computer vision module determines a seatbelt-neck distance (SND) and a seatbelt-shoulder distance (SSD) for an occupant of the vehicle. The motor adjusts the height of the seat belt. The controller control the motor to set the height of the seat belt based on the SND and the SSD.

14 Claims, 9 Drawing Sheets

(56) References Cited

U.S. PATENT DOCUMENTS

| | | | |
|---|---|---|---|
| 2010/0182425 A1* | 7/2010 | Sakakida | B60N 2/002 348/135 |
| 2015/0232061 A1* | 8/2015 | Cuddihy | B60R 16/037 701/45 |
| 2016/0046261 A1* | 2/2016 | Gulash | G05D 1/0055 701/23 |
| 2016/0078306 A1 | 3/2016 | Artan et al. | |
| 2018/0009409 A1* | 1/2018 | Gast | B60R 22/36 |
| 2018/0281627 A1 | 10/2018 | Ali | |
| 2018/0326944 A1* | 11/2018 | Cech | B60R 22/48 |
| 2018/0361984 A1* | 12/2018 | Lin | G06K 9/00382 |
| 2020/0094776 A1* | 3/2020 | Ohno | B60R 22/48 |
| 2020/0231109 A1 | 7/2020 | Baltaxe et al. | |
| 2021/0114541 A1* | 4/2021 | Hosokawa | B60R 21/01552 |
| 2021/0206344 A1* | 7/2021 | George | G06K 9/32 |

FOREIGN PATENT DOCUMENTS

| | | | | |
|---|---|---|---|---|
| CN | 105946786 A * | 9/2016 | | B60R 22/48 |
| CN | 105946786 A | 9/2016 | | |
| GB | 2546584 A * | 7/2017 | | B60R 22/48 |
| WO | 2019111244 A1 | 6/2019 | | |

* cited by examiner

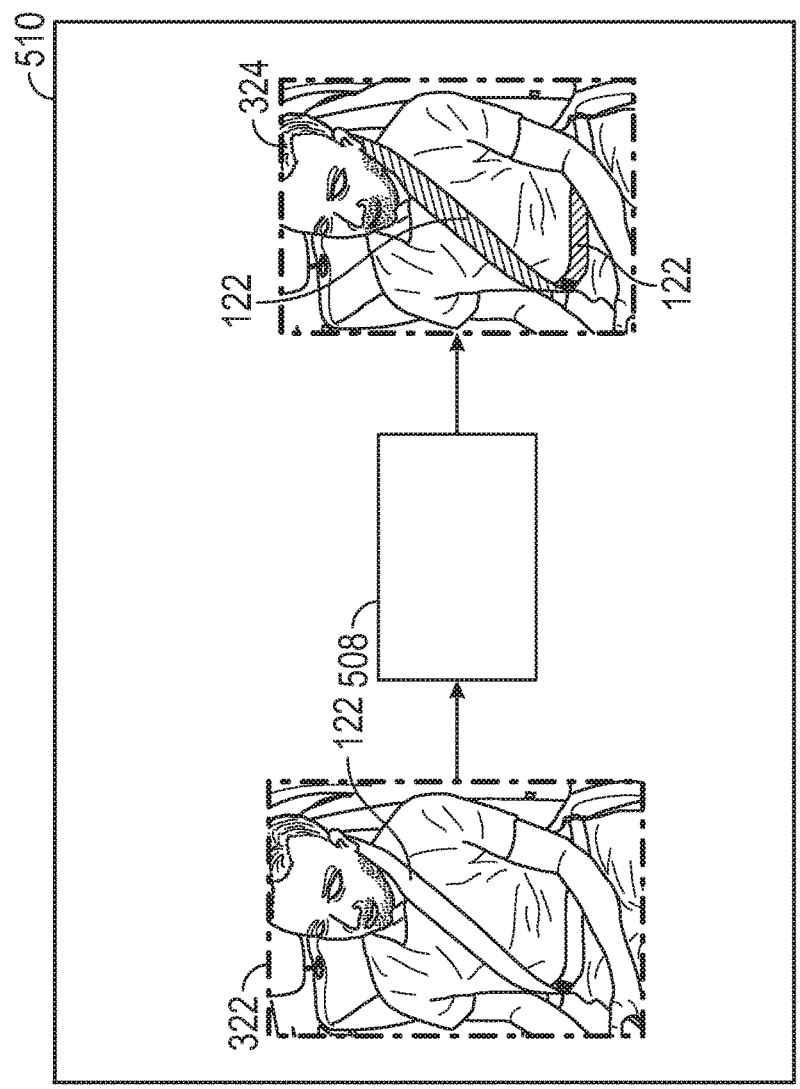
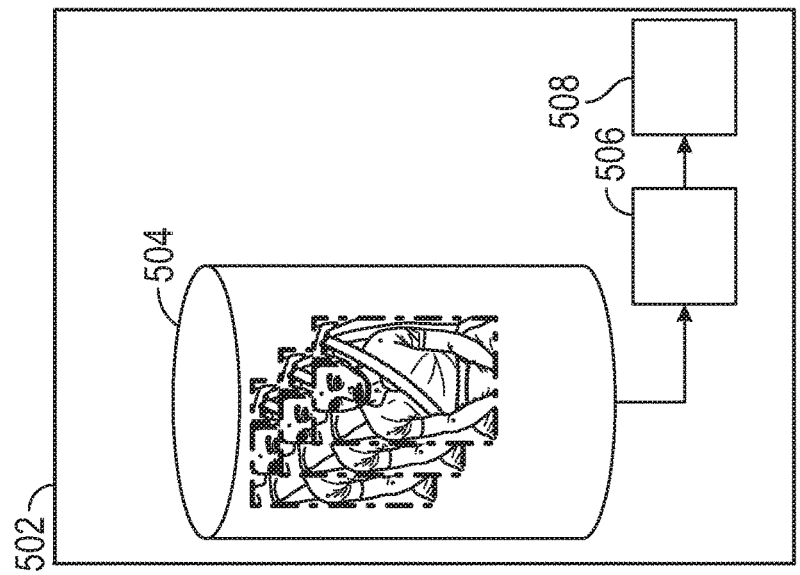
FIG. 5

SYSTEM AND METHOD TO AUTOMATICALLY SET THE HEIGHT OF THE TORSO SECTION OF A SEAT BELT

INTRODUCTION

The subject disclosure relates to seat belt systems in vehicles and, in particular, to a system and method of automatically setting a height of a seat belt to fit an occupant of the vehicle.

Setting the height of a seat belt's torso section is crucial to enhancing an occupant's safety. The seat belt should be located on the collarbone, mid-distance between the neck and the shoulder of the occupant in order to improve restraint by the seat belt and to avoid strangling and tissue damage during a crash event. However, few people actually set the seat belt's height properly and many do not even know that it is possible to adjust the seat belt or that there is a proper height. Accordingly, it is desirable to provide a system that adjusts a seat belt height automatically to fit the occupant's dimensions.

SUMMARY

In one exemplary embodiment, a computer-implemented method for setting a height of a seat belt in a vehicle is disclosed. A seatbelt-neck distance (SND) and a seatbelt-shoulder distance (SSD) for an occupant of the vehicle is determined using a computer vision module. The height of the seat belt is set based on the SND and the SSD via a controller.

In addition to one or more of the features described herein, the method further includes determining a centerline of the seat belt and determining the SND and the SSD using the centerline. The method further includes determining the SND by minimizing a distance between points of the centerline and a neck location and determining the SSD by minimizing a distance between all points of the centerline and a shoulder location. The further includes determining a neck location and a shoulder location using a neural network. The method further includes controlling, via the controller, a motor to adjust the height of the seat belt. The motor rotates a threaded pillar to move a threaded carrier along the length of the threaded pillar to set the height of the seat belt. The height of the seat belt is set so that the SND is approximately equal to the SSD.

In another exemplary embodiment, a system for setting a height of a seat belt in a vehicle is disclosed. The system includes a computer vision module, a motor and a controller. The computer vision module determines a seatbelt-neck distance (SND) and a seatbelt-shoulder distance (SSD) for an occupant of the vehicle. The motor adjusts the height of the seat belt. The controller control the motor to set the height of the seat belt based on the SND and the SSD.

In addition to one or more of the features described herein, the computer vision module determines a centerline of the seat belt and determines the SND and the SSD using the centerline. The computer vision module determines the SND by minimizing a distance between points of the centerline and a neck location and determines the SSD by minimizing a distance between all points of the centerline and a shoulder location. The computer vision module includes a neural network configured to determine a neck location and a shoulder location. The motor rotates a threaded pillar to move a threaded carrier along the length of the threaded pillar to set the height of the seat belt. The controller sets the height of the seat belt so that the SND is approximately equal to the SSD. An interface allows the occupant to adjust the height of the seat belt.

In yet another exemplary embodiment, a vehicle is disclosed. The vehicle includes a computer vision module, a motor and a controller. The computer vision module determines a seatbelt-neck distance (SND) and a seatbelt-shoulder distance (SSD) for an occupant of the vehicle. The motor adjusts a height of the seat belt. The controller controls the motor to set the height of the seat belt based on the SND and the SSD.

In addition to one or more of the features described herein, the computer vision module determines a centerline of the seat belt and determines the SND and the SSD using the centerline. The computer vision module determines the SND by minimizing a distance between points of the centerline and a neck location and determines the SSD by minimizing a distance between all points of the centerline and a shoulder location. The computer vision module includes a neural network configured to determine a neck location and a shoulder location. The motor rotates a threaded pillar to move a threaded carrier along the length of the threaded pillar to set the height of the seat belt. The controller sets the height of the seat belt so that the SND is approximately equal to the SSD.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 illustrates operation of a seat belt segmentation module of the computer vision module;

DETAILED DESCRIPTION

Figure 1:
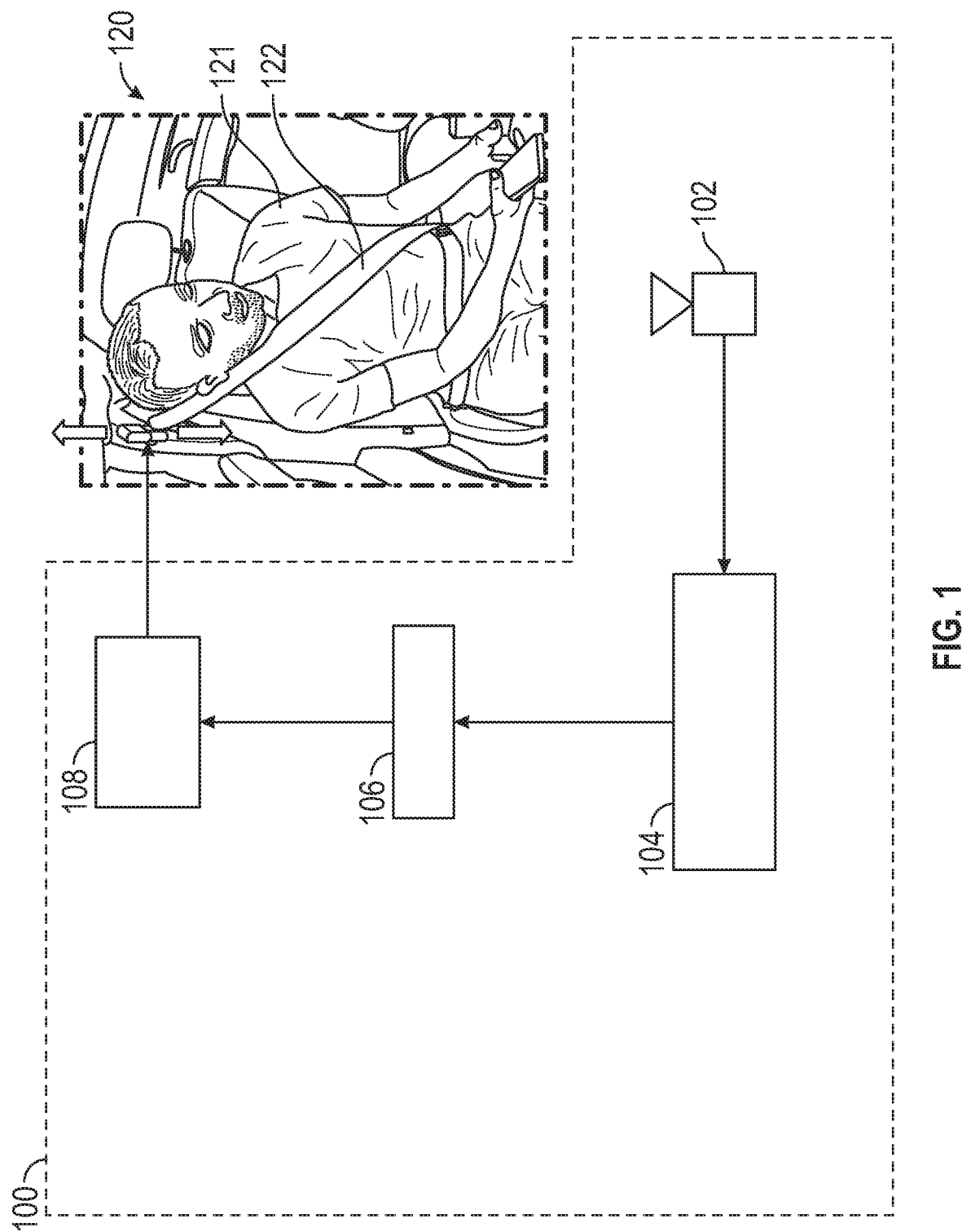
FIG. 1 shows a schematic diagram illustrating operating of a seat belt adjustment system.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment FIG. 1 shows a schematic diagram illustrating operating of a seat belt adjustment system 100. The seat belt adjustment system 100 includes a camera 102, a computer vision module 104, a controller 106, and an actuator 108. The camera 102 obtains an image 120 of the occupant 121 in the vehicle once the occupant has fastened their seat belt 122. The computer vision module 104 locates the seat belt within the image 120 obtained by the camera 102 as well as a pose of the occupant and determines a seat belt-shoulder distance (SSD) and a seat belt-neck distance (SND). The controller 106 determines what adjustments, if any, are to be made to the height of the seat belt 122. The controller 106 then operates the actuator 108 in order to set the height of the seat belt to a desired or proper height.

Figure 2:
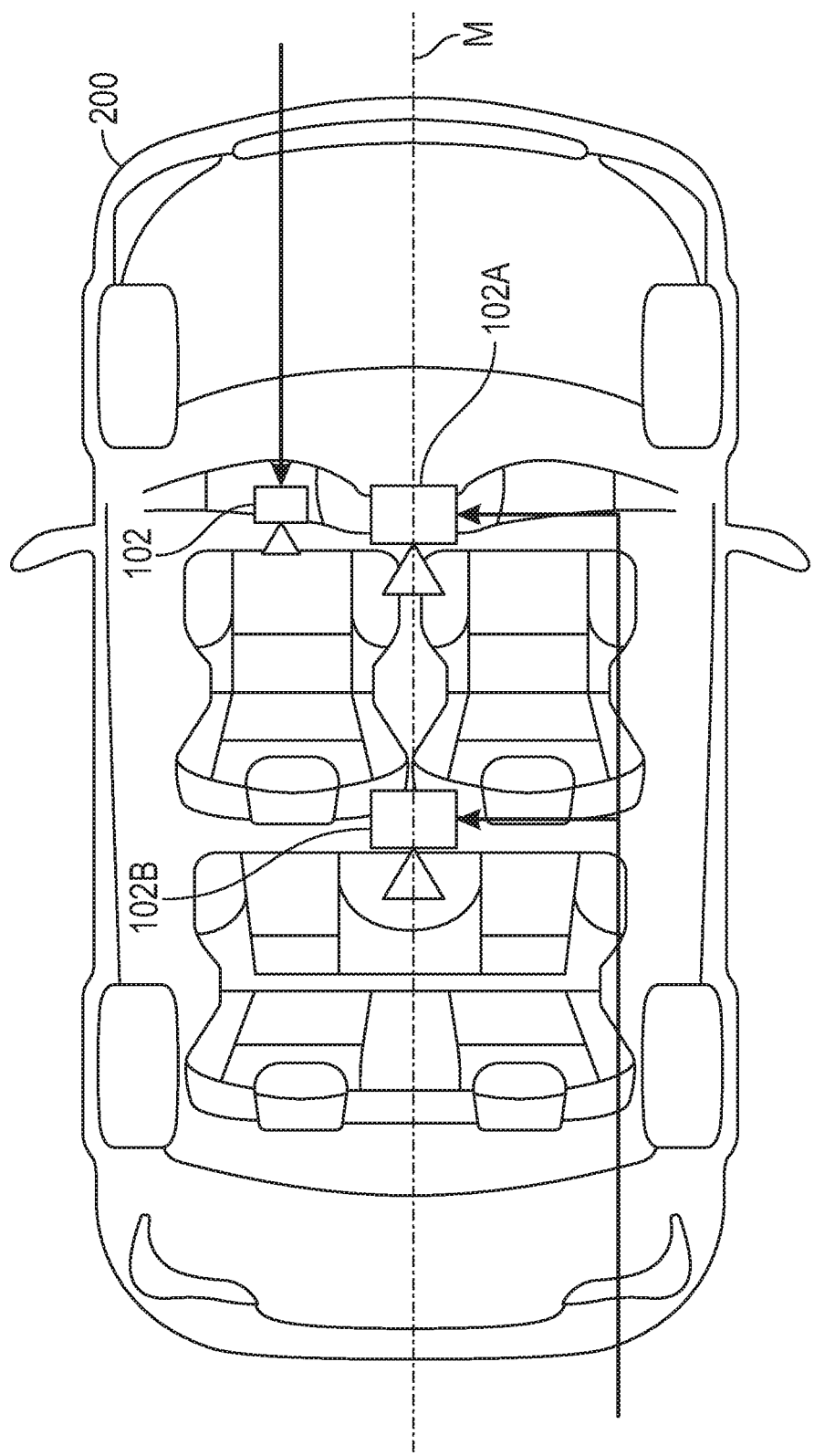
FIG. 2 shows a plan view of a vehicle that illustrates possible camera locations in the vehicle for a camera of the seat belt adjustment system.

FIG. 2 shows a plan view of a vehicle 200 that illustrates possible camera locations in the vehicle for camera 102. In various embodiments, the vehicle 200 includes a camera 102 within a steering wheel column of the vehicle or located at a dashboard in front of the driver's seat as part of a driver monitoring system. Alternatively, cameras 102A and 102B can be placed at central locations along a medial line "M" of the vehicle 200. Camera 102A can be placed in front of the front row of seats, while camera 102B can be placed in front of the back row of seats. Additional cameras can be included for vehicles that have additional rows of seats. In various embodiments, cameras 102A and 102B can be wide field-of-view cameras. Wide field-of-view cameras can have a field-of view anywhere between 150 degrees and 170 degrees, in various embodiments.

Figure 3:
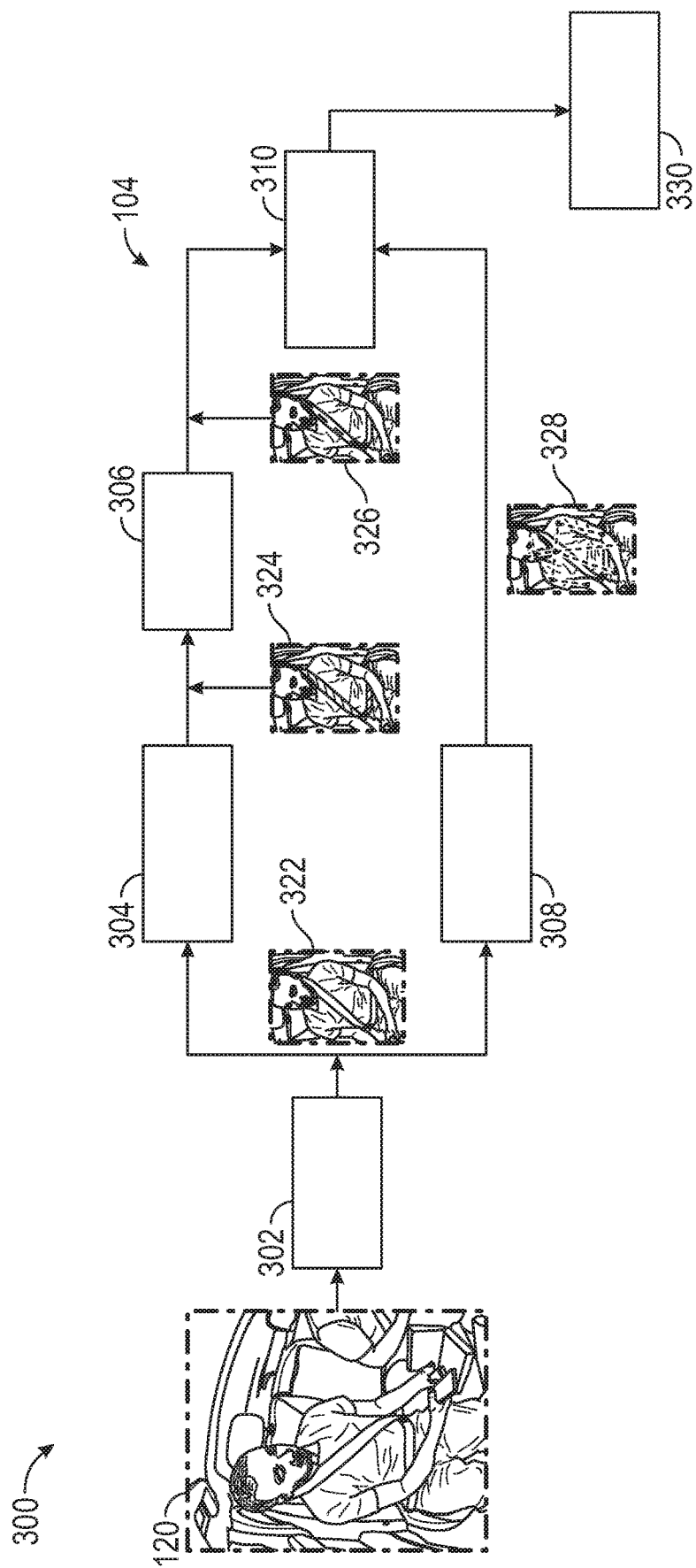
FIG. 3 shows a schematic diagram illustrating various components of a computer vision module of the seat belt adjustment system.

FIG. 3 shows a schematic diagram 300 illustrating various components of the computer vision module 104 of the seat belt adjustment system 100. The computer vision module 104 includes an image pre-processor 302, a seat belt segmentation module 304, a centerline extraction module 306, a pose estimation module 308 and a distance extraction module 310. The image pre-processor 302 receives the image 120 from the camera 102 and crops and normalizes the image to form a pre-processed image 322. The pre-processed image 322 is provided to the seat belt segmentation module 304 that locates and produces a segmentation image 324 that identifies pixels of the seat belt 122 within the pre-processed image 322. The segmentation image 324 is provided to the centerline extraction module 306 that determines a centerline (in centerline image 326) of the seat belt.

The pre-processed image 322 is also provided from the image pre-processor 302 to the pose estimate module 308. The pose estimate module 308 produces a skeletal model image 328 including a determined skeletal model 702, FIG. 7 of the occupant 121 or passenger in order to determine the location of various key points of the occupant. The skeletal model 702, FIG. 7 and the centerline of the seat belt 122 are both provided to the distance extraction module 310. The distance extraction module produces output 330 in the form of the seat belt-shoulder distance (SSD) and the seat belt-neck distance (SND) from the skeletal model and the centerline. These components of the computer vision module 104 are discussed in further detail with respect to FIGS. 4-7.

Figure 4:
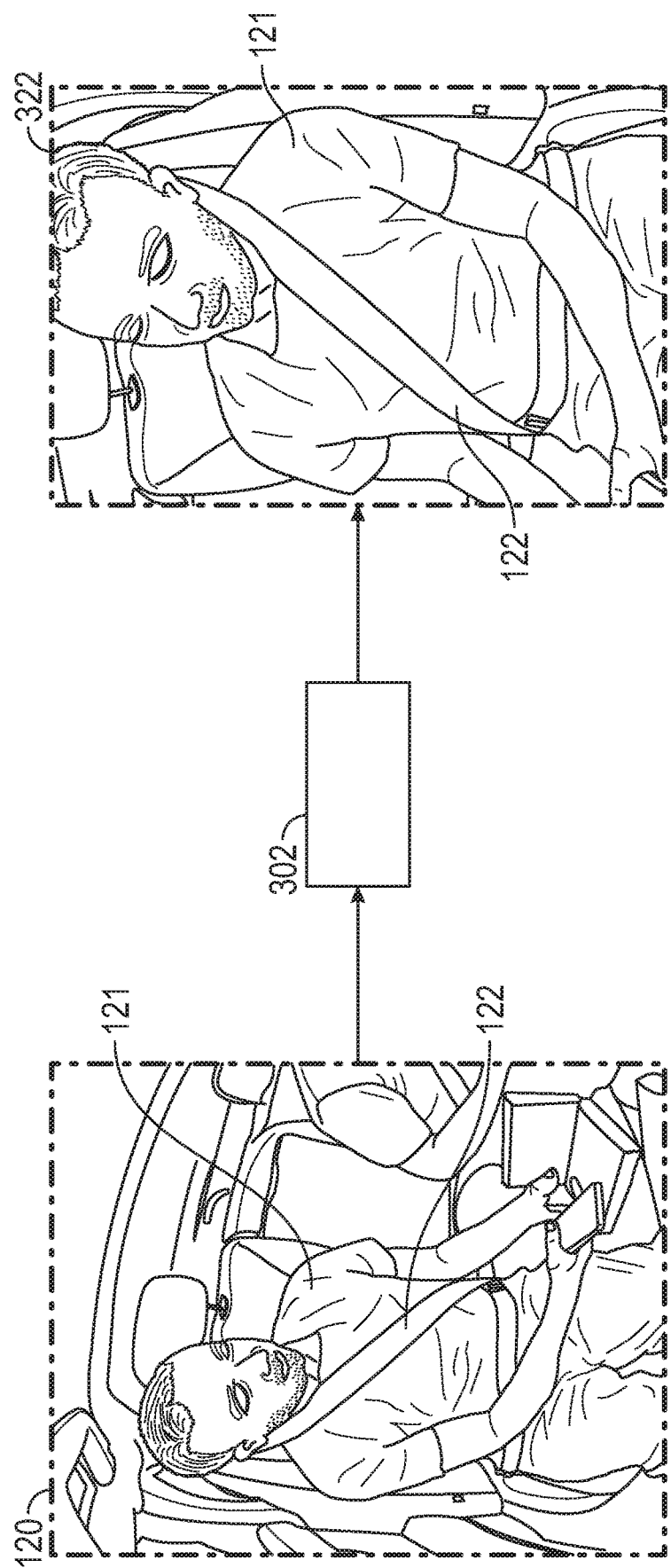
FIG. 4 illustrates operation of an image pre-processor of the computer vision module.

FIG. 4 illustrates operation of the image pre-processor 302 of the computer vision module 104. The image pre-processor 302 crops a region of interest (ROI) in the image 120 with respect to the expected location of an occupant 121 or passenger. In various embodiments, the ROI is a fixed and/or pre-defined region based on the seat location. In order to perform standardized calculations, an image of a passenger that is on a left side of the vehicle is flipped around its vertical axis. Therefore, all pre-processed images include an occupant 121 with a torso section of the seat belt 122 appearing to pass over the occupant's left shoulder. Pre-processed image 322 shows a cropped region that has been flipped.

The intensity I of each pixel of the image is normalized using the Eq. (1):

$$I' = ((I/255) - 0.5) \times 2 \qquad \text{Eq. (1)}$$

This normalization sets a boundary for the transformed pixel intensities I' to within −1 and +1, thereby reducing or preventing pixels with high intensities from overwhelming the pixels having more standard intensities.

FIG. 5 illustrates operation of the seat belt segmentation module 304 of the computer vision module 104. The seat belt segmentation module 304 can include a neural network, such as a Fully Convolution Network (FCN) 508. The FCN operates in a training mode 502 in which various annotated data 504 is used to create or train an FCN fitting algorithm 506 of the FCN 508. The FCN 508 can then operate in a real-time execution mode 510 on the pre-processed image 322 in order to produce a segmentation image 324 and determine the location of the seat belt 122 in the segmentation image 324.

Figure 6:
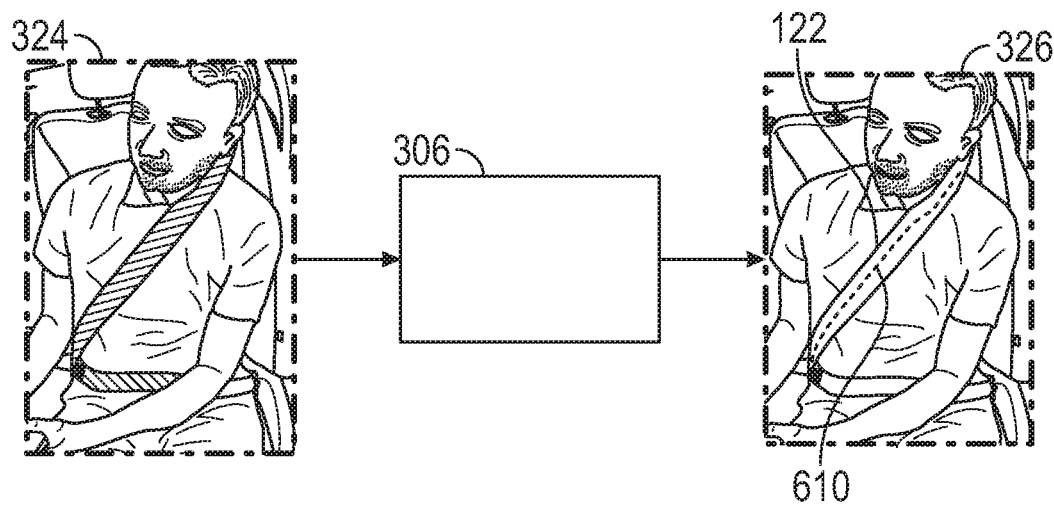
FIG. 6 illustrates operation of a centerline extraction module of the computer vision module.

FIG. 6 illustrates the operation of the centerline extraction module 306 of the computer vision module 104. The centerline extraction module 306 uses one or more algorithms to determine the location of a centerline 610 of the seat belt 122. In one embodiment, the centerline extraction module 306 employs a morphology algorithm such as thinning to calculate the centerline 610. In another embodiment, the centerline extraction module 306 employs a medial axis extraction method for the same purpose.

Figure 7:
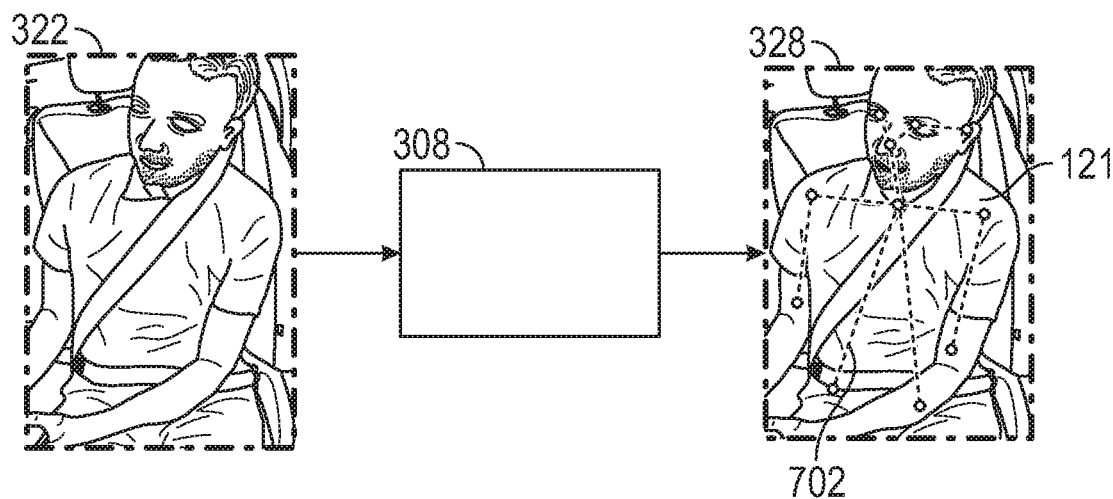
FIG. 7 illustrates operation of a pose estimate module of the computer vision module.

FIG. 7 illustrates operation of the pose estimate module 308 of the computer vision module 104. The occupant's pose can be estimated by an algorithm such as convolutional pose machines. A trained network outputs the estimated location of key points of the occupant 121 as part of a skeletal model 702. The key points correspond to joints such as knees, hips, shoulders, elbows, wrists, neck, forehead, eyes and ears. Of particular interest is the location of the neck and shoulders.

Once the centerline 610 and the locations of the neck and shoulders have been determined, the distance extraction module 310 determines the seat belt-shoulder distance (SSD) and the seat belt-neck distance (SND). The seat belt-shoulder distance (SSD) can be determined using the following Eq. (2):

$$SSD = \min_{x \in SB}(\|x - Sh\|) \qquad \text{Eq. (2)}$$

where SB is the set of pixels belonging to the seat belt centerline 610 and Sh is the pixel location of the shoulder joint. The seat belt-neck distance (SND) can be determined using the following Eq. (3):

$$SND = \min_{x \in SB}(\|x - N\|) \qquad \text{Eq. (3)}$$

where N is the pixel location of the neck joint.

Figure 8:
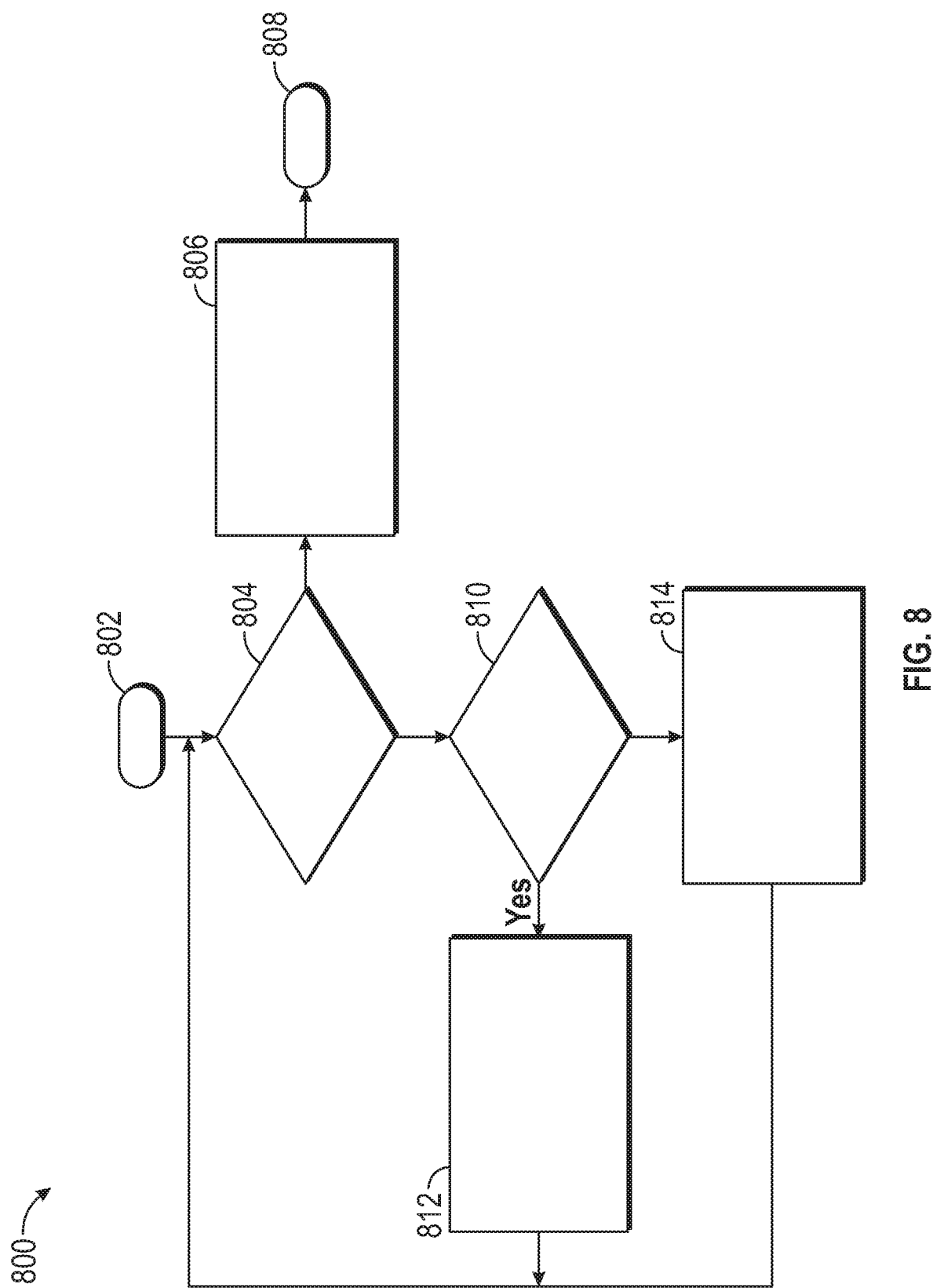
FIG. 8 shows a flowchart illustrating a decision process performed by the controller of the seat belt adjustment system in order to adjust the height of the seat belt.

FIG. 8 shows a flowchart 800 illustrating a decision process performed by the controller 106 of the of seat belt adjustment system 100 in order to adjust the height of the seat belt 122. At box 802, the decision process starts by receiving the seat belt-shoulder distance (SSD) and the seat belt-neck distance (SND) as input from the distance extraction module 310. The seat belt 122 is properly positioned when the SSD is about equal to the SND. Therefore, in box 804, the difference between the SSD and the SND is compared to a criterion c that defines a small non-zero limit. If the difference is less than the selected criterion, then the seat belt is positioned approximately correctly. Therefore, the method proceeds to box 806, where the position of the seat belt is left alone and then to box 808 where the process stops.

On the other hand, if, in box 804, the difference between SSD and SND is greater than the criterion, then either the seat belt is too high or too low. The method then proceeds to box 810 which compares the SND to the SSD. If the SSD is greater than the SND, then the seat belt is too high and the method proceeds to box 812. In box 812, the seat belt 122 is moved down. Returning to box 810, if the SSD is less than the SND, then the seat belt is too low and the method proceeds to box 814. In box 814, the seat belt is moved up. From either of box 812 or 814, the method returns to box 804 in which the new values of SND and SSD are once again compared to each other. This can require once again determining the SND and SSD using the computer vision module, in various embodiments. This method continues until the SSD and SND are equal to within the selected criterion $\epsilon$.

Figure 9:
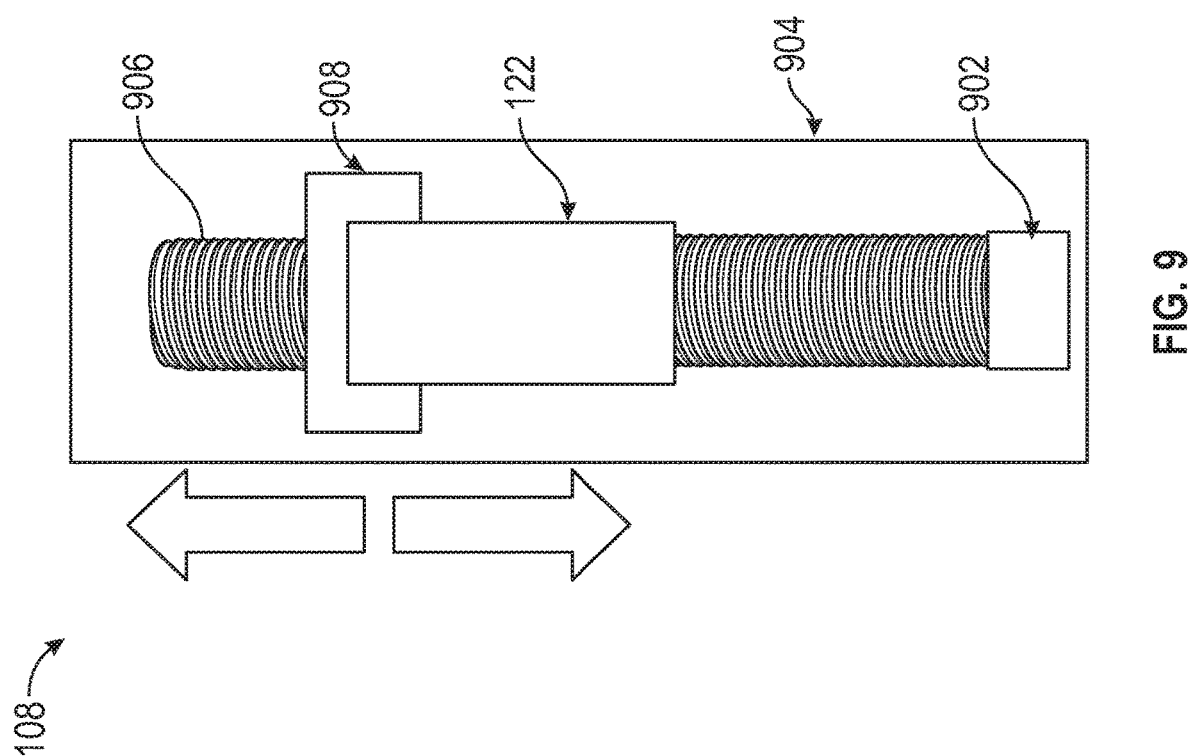
FIG. 9 shows details of a seat belt actuator that can be used to adjust the seat belt height.

FIG. 9 shows details of the seat belt actuator 108 that can be used to adjust the height of the seat belt 122. The actuator 108 includes a motor 902, a support structure 904 including a threaded pillar 906 that extends along the length of the support structure 904 and is offset from the support structure, a threaded carrier 908 and the seat belt 122. The threaded carrier 908 is threadingly engaged to the threaded pillar 906. The motor 902 rotates the threaded pillar 906 in one of a clockwise direction and a counter clockwise direction based upon a command from the actuator 108. The actuator 108 commands rotation of the threaded pillar 906 in one direction when the SSD is greater than the SND and in the opposite direction when the SSD is less than the SND. The threaded carrier 908 slides within a track of the support structure 904, causing the threaded carrier 908 to move in one direction when the threaded pillar is rotated in the clockwise direction and in the opposite direction when the threaded pillar is rotated in the counter-clockwise direction. The motor 902 therefore is operated by the controller 106 based on the instructions from either box 812 or box 814 of the flowchart 800 of FIG. 8 until seat belt 122 is in its optimal position.

Figure 10:
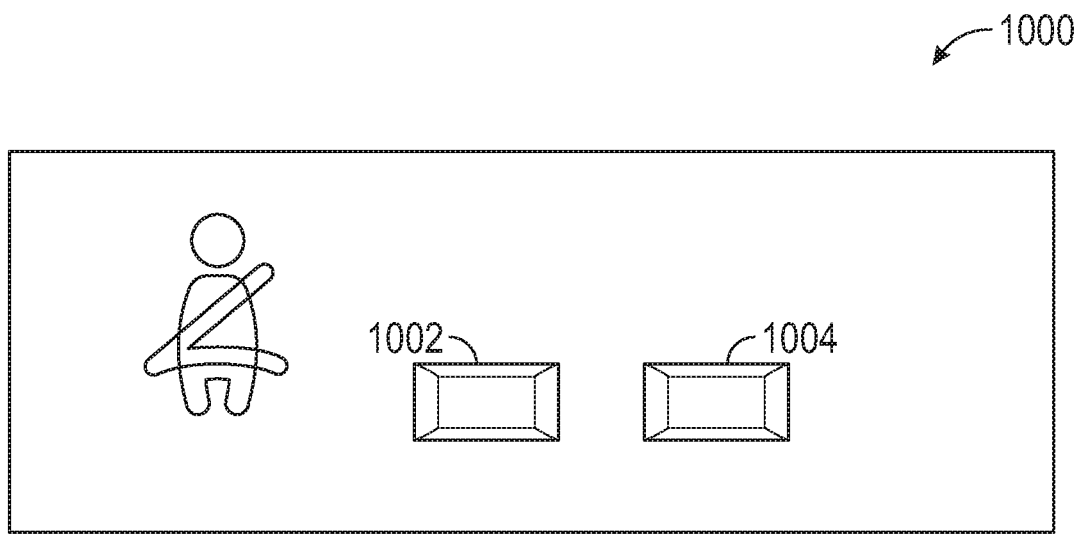
FIG. 10 shows an interface that includes buttons allowing the occupant to fine tune the height of the seat belt to their desired setting.

After the seat belt adjustment system 100 has completed its operation, the occupant 121 may still choose to reposition the seat belt 122. FIG. 10 shows an interface 1000 including buttons 1002 and 1004 allowing the occupant to fine tune the height of the seat belt to their desired setting.

Figure 11:
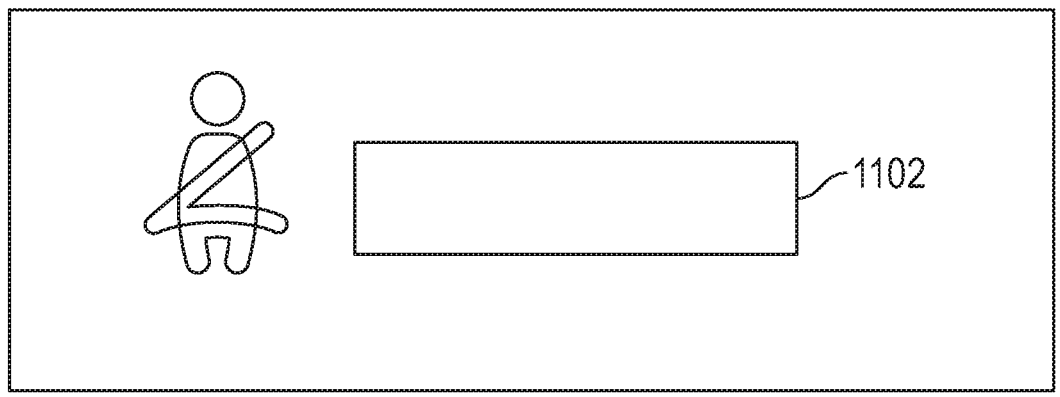
FIG. 11 shows a screen that can be shown to indicate successful adjustment of the seat belt to its proper height.

The seat belt adjustment system 100 can be activated under different situations. If the vehicle 200 is an autonomous vehicle the seat belt adjustment system 100 can be activated as soon as the occupant enters the vehicle and buckles the seat belt, sometimes refusing to operate until such buckling has occurred. For a non-autonomous vehicle, the occupant can select an option at a dashboard or infotainment system of the vehicle. The system can ask the occupant to seat themselves properly, the system then adjusts the seat belt's height. The system can chime or create an audible signal to inform the occupant that the process has finished. Additionally, a message 1102 can be presented at the dashboard or an infotainment screen, such as shown in FIG. 11.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for setting a height of a seat belt in a vehicle, comprising:
   determining, using a computer vision module, a centerline of the seat belt;
   determining, using the computer vison module, a seatbelt-neck distance (SND) by minimizing a distance between points of the centerline and a neck location for an occupant of the vehicle and a seatbelt-shoulder distance (SSD) by minimizing a distance between points of the centerline and a shoulder location for the occupant of the vehicle; and
   setting the height of the seat belt based on the SND and the SSD via a controller.

2. The method of claim 1, further comprising determining the neck location and the shoulder location using a neural network.

3. The method of claim 1, further comprising setting the height of the seat belt so that the SND is approximately equal to the SSD.

4. The method of claim 1, further comprising controlling, via the controller, a motor to adjust the height of the seat belt.

5. The method of claim 4, wherein the motor rotates a threaded pillar to move a threaded carrier along a length of the threaded pillar to set the height of the seat belt.

6. A system for setting a height of a seat belt in a vehicle, comprising:
   a computer vision module configured to determine a centerline of the seat belt, determine a seatbelt-neck distance (SND) by minimizing a distance between points of the centerline and a neck location for an occupant of the vehicle, and determine a seatbelt-shoulder distance (SSD) by minimizing a distance between points of the centerline and a shoulder location for the occupant of the vehicle;
   a motor configured to adjust the height of the seat belt; and
   a controller configured to control the motor to set the height of the seat belt based on the SND and the SSD.

7. The system of claim 6, wherein the computer vision module further comprises a neural network configured to determine the neck location and the shoulder location.

8. The system of claim 6, wherein the motor rotates a threaded pillar to move a threaded carrier along a length of the threaded pillar to set the height of the seat belt.

9. The system of claim 6, wherein the controller sets the height of the seat belt so that the SND is approximately equal to the SSD.

10. The system of claim 6 further comprising an interface allowing the occupant to adjust the height of the seat belt.

11. A vehicle, comprising:
- a computer vision module configured to determine a centerline of the seat belt, determine a seatbelt-neck distance (SND) by minimizing a distance between points of the centerline and a neck location for an occupant of the vehicle, and determine a seatbelt-shoulder distance (SSD) by minimizing a distance between points of the centerline and a shoulder location for the occupant of the vehicle;
- a motor configured to adjust a height of the seat belt; and
- a controller configured to control the motor to set the height of the seat belt based on the SND and the SSD.

12. The vehicle of claim 11, wherein the computer vision module further comprises a neural network configured to determine the neck location and the shoulder location.

13. The vehicle of claim 11, wherein the motor rotates a threaded pillar to move a threaded carrier along a length of the threaded pillar to set the height of the seat belt.

14. The vehicle of claim 11, wherein the controller sets the height of the seat belt so that the SND is approximately equal to the SSD.

\* \* \* \* \*